(12) United States Patent
Scaife et al.

(10) Patent No.: US 11,577,684 B2
(45) Date of Patent: Feb. 14, 2023

(54) VEHICLE SAFETY BARRIER

(71) Applicant: NUVECH SOLUTIONS LIMITED, Ripon (GB)

(72) Inventors: Simon Scaife, Ripon (GB); Sarah Scaife, Ripon (GB)

(73) Assignee: NuVech Solutions Limited, Ripon (GB)

( * ) Notice: Subject to any disclaimer, the term of this patent is extended or adjusted under 35 U.S.C. 154(b) by 0 days.

(21) Appl. No.: 16/963,875

(22) PCT Filed: Jan. 21, 2019

(86) PCT No.: PCT/GB2019/050153
§ 371 (c)(1),
(2) Date: Jul. 22, 2020

(87) PCT Pub. No.: WO2019/145688
PCT Pub. Date: Aug. 1, 2019

(65) Prior Publication Data
US 2020/0346612 A1    Nov. 5, 2020

(30) Foreign Application Priority Data

Jan. 23, 2018  (GB) ...................... 1801050
Mar. 23, 2018  (GB) ...................... 1804723
Aug. 10, 2018  (GB) ...................... 1813119

(51) Int. Cl.
*B60R 21/34*    (2011.01)
*B60Q 1/26*    (2006.01)
(Continued)

(52) U.S. Cl.
CPC ............ *B60R 21/34* (2013.01); *B60Q 1/2657* (2013.01); *B60Q 1/2692* (2013.01); *B60Q 1/32* (2013.01); *B60Q 1/50* (2013.01)

(58) Field of Classification Search
CPC .... B60R 21/34; B60Q 1/2657; B60Q 1/2692; B60Q 1/32; B60Q 1/50
(Continued)

(56) References Cited

U.S. PATENT DOCUMENTS 4,825,192 A    4/1989  Wells
5,281,948 A    1/1994  Estrada
(Continued)

FOREIGN PATENT DOCUMENTS

CA    2079829 A1    4/1994
CA    2098937 A1    12/1994
(Continued)

OTHER PUBLICATIONS

International Search Report and Written Opinion issued by the International Searching Authority, the European Patent Office, for International Application No. PCT/GB2019/050153, dated Apr. 11, 2019, 15 pages.
(Continued)

*Primary Examiner* — Eric Blount
(74) *Attorney, Agent, or Firm* — Gesmer Updegrove LLP (57) ABSTRACT

A vehicle safety barrier, for mounting on a vehicle, comprises a deployable barrier arm, wherein the barrier arm is configured for movement between a first, stowed position, and a second, operational position and wherein, in the second position, the barrier arm is arranged to project a predetermined distance from the vehicle to indicate a safe passing distance for another road user.

20 Claims, 7 Drawing Sheets

(51) Int. Cl.
*B60Q 1/32* (2006.01)
*B60Q 1/50* (2006.01)

(58) Field of Classification Search
USPC .................. 340/425.5, 426.23, 435, 436
See application file for complete search history.

(56) References Cited

U.S. PATENT DOCUMENTS

| | | | | |
|---|---|---|---|---|
| 5,293,151 | A | 3/1994 | Rose | |
| 5,406,251 | A | 4/1995 | Leis | |
| 5,564,359 | A | 10/1996 | Harder | |
| 5,635,902 | A | 6/1997 | Hochstein | |
| 5,847,642 | A | 12/1998 | Esposito | |
| 6,213,047 | B1 * | 4/2001 | Means | B60Q 1/2692 |
| | | | | 116/28 R |
| 6,288,651 | B1 * | 9/2001 | Souza | E01F 9/688 |
| | | | | 200/86 A |
| 6,396,395 | B1 | 5/2002 | Zielinski et al. | |
| 6,435,127 | B1 | 8/2002 | Saviano et al. | |
| 6,894,604 | B2 * | 5/2005 | Phillips | B60Q 1/50 |
| | | | | 180/271 |
| 7,841,269 | B1 * | 11/2010 | Jacobs | F41H 5/013 |
| | | | | 89/36.08 |
| 8,740,267 | B1 * | 6/2014 | Wilson | B60Q 1/50 |
| | | | | 293/22 |
| 9,821,743 | B2 * | 11/2017 | Zhang | B60Q 1/525 |
| 10,300,845 | B2 * | 5/2019 | Maiorana | B60W 50/14 |
| 10,343,598 | B2 * | 7/2019 | Ringer | B60R 21/34 |
| 10,521,179 | B2 * | 12/2019 | Monroe | G06F 3/0488 |
| 10,780,823 | B2 * | 9/2020 | Ringer | B60Q 1/50 |
| 2004/0123792 | A1 * | 7/2004 | Urban | B60Q 7/005 |
| | | | | 116/35 R |
| 2007/0027797 | A1 * | 2/2007 | Claus | G06Q 40/00 |
| | | | | 705/37 |
| 2009/0015392 | A1 * | 1/2009 | Takahashi | B60R 21/0136 |
| | | | | 340/436 |
| 2012/0111261 | A1 * | 5/2012 | Schmitt | B60Q 1/50 |
| | | | | 116/28 R |
| 2017/0210284 | A1 * | 7/2017 | Donan | B60Q 1/503 |
| 2018/0354414 | A1 * | 12/2018 | Maiorana | B60Q 5/00 |
| 2019/0366962 | A1 * | 12/2019 | Moss | B60Q 1/50 |
| 2020/0130569 | A1 * | 4/2020 | Lindsey | G08G 1/005 |
| 2020/0312201 | A1 * | 10/2020 | Olds | G09F 17/00 |
| 2020/0332484 | A1 * | 10/2020 | Roy | B60R 11/06 |

FOREIGN PATENT DOCUMENTS

| | | |
|---|---|---|
| KR | 100840754 B1 | 6/2008 |
| WO | 2010110704 A1 | 9/2010 |

OTHER PUBLICATIONS

Search Report issued by the Intellectual Property Office in related Great Britain Application No. GB1801050.4 dated Jun. 7, 2018, 5 pages.

Search Report issued by the Intellectual Property Office in related Great Britain Application No. GB1900792.1 dated Jun. 25, 2019, 3 pages.

* cited by examiner

VEHICLE SAFETY BARRIER

CROSS-REFERENCE TO RELATED APPLICATIONS

The present application is a U.S. National Stage filing under 35 U.S.C. 371(c) of International Application No. PCT/GB2019/050153, filed Jan. 21, 2019, which claims priority to Great Britain Patent Application Nos. 1801050.4, 1804723.3 and 1813119.3, filed Jan. 23, 2018, Mar. 23, 2018 and Aug. 10, 2018, respectively, the disclosures of which are hereby incorporated by reference in their entireties.

The present invention relates to a vehicle safety barrier, in particular for mounting on a vehicle indicating a safe passing distance for other road users.

BACKGROUND

Road workers, delivery drivers, and refuse collectors, are often required to perform their duties on or beside the road, often whilst the road is being used by other users going about their every-day tasks.

Such workers are often injured and in extreme cases killed by the drivers of other vehicles driving dangerously, for example not leaving an adequate distance between the side of the worker's vehicle and their own.

Some of the above workers, for example, refuse collectors vehicle transporter workers, are required to work alongside their vehicles, often at the side of the road near other passing road users. Other road users may pass close to the side of the vehicle thereby increasing the risk of injury to the workers whilst they are undertaking their duties.

To counteract, and attempt to reduce the likelihood of, such an accident and to provide a safer working environment, it is not uncommon for road workers to place high-visibility cones on the road, defining a safe space for the worker to operate. However, it is not always practical to lay out cones, such as when the vehicle is required to move frequently throughout a task, e.g. in refuse collection.

Furthermore, there are additional risks associated with storing and laying out the cones at the start of a task.

Some vehicles also have additional lights which shine on the road surface to indicate a safe passing distance. However, these do not physically deter a third-party vehicle from driving dangerously close. Furthermore, whilst they may be used to provide an additional indication, such as colour changes or flashing, there may be difficulties in seeing them in daylight. Therefore, such measures do not provide a significant safety improvement for the road.

Embodiments of the present invention aim to provide a vehicle safety barrier that addresses, at least in part, the aforementioned problems.

STATEMENTS OF INVENTION

The present invention is defined in the attached independent claims, to which reference should now be made. Further preferred features may be found in the sub-claims appended thereto.

According to a first aspect of the present invention, there is provided a vehicle safety barrier for mounting on a vehicle, the barrier comprising a barrier arm, wherein the barrier arm is configured for movement between a first, stowed position, and a second, operational position and wherein, when in the second position, the barrier arm is arranged to project a predetermined distance from the vehicle.

Preferably, the barrier arm is inflatable.

The vehicle safety barrier may further comprise a biasing means for biasing the barrier arm into the stowed position. The biasing means may be a recoil spring.

The barrier arm may be configured to periodically move between the stowed position and operational position whilst in use.

Optionally, the barrier arm may be activated by a switch. Alternatively and/or additionally, the barrier arm may be activated remotely or automatically.

The vehicle safety barrier may further comprise a deployment indicator for indicating when the barrier arm is in the operational position.

The barrier arm and/or housing may further comprise one or more lights.

The barrier arm may comprise one or more light guides.

Optionally, the barrier arm may comprise one or more proximity sensors and/or impact sensors.

According to a second aspect of the present invention, there is provided a vehicle safety barrier system for a vehicle, comprising one or more vehicle safety barriers according to any statement herein, and an actuator, wherein the actuator is arranged in use to cause the or each vehicle safety barrier to move between a first, stowed position, and a second, operational position.

The actuator may be a pneumatic system. The pneumatic system may comprise a vehicle pneumatic system.

Preferably, the barrier arm is inflatable.

The vehicle safety barrier may further comprise a biasing means for biasing the barrier arm into the stowed position. The biasing means may be a recoil spring.

The barrier arm may be configured to cyclically move between the stowed position and operational position whilst in use.

The vehicle safety barrier may further comprise a deployment indicator for indicating when the barrier arm is in the operational position.

The barrier arm may further comprise one or more lights.

Optionally, the barrier arm may comprise one or more proximity sensors and/or impact sensors.

Optionally, the system comprises a communication means for communication with a server. Preferably, the server is a remote server location.

The position and/or deployment status of the barrier arm may be transmitted to the server.

Any impacts detected by the one or more impact sensors may be transmitted to the server.

The actuator may be under the control of an activation device which may comprise a switch. Alternatively and/or additionally, the activation device may comprise a portable electronic device, such as a smartphone.

The status of the system may be recorded on the portable electronic device.

According to a third aspect of the present invention, there is provided a method of deploying a vehicle safety barrier by controlling the flow of a fluid into and out of a barrier arm of the vehicle safety barrier according to any statement herein.

The fluid may be air or another gas or may comprise a liquid such as hydraulic fluid, and/or water.

According to a fourth aspect of the present invention, there is provided a vehicle comprising a vehicle safety barrier or barrier system according to any statement herein.

The invention may include any combination of features or limitations referred to herein, except such a combination of features as are mutually exclusive, or mutually inconsistent.

BRIEF DESCRIPTION OF FIGURES

Preferred embodiments of the present invention will now be described by way of example only with reference to the accompanying drawings, in which.

Throughout the figures, like reference numerals are used to denote like features.

SPECIFIC DESCRIPTION

When road workers, such as refuse collectors or delivery drivers, are required to work in, or at the side of the road, there is a risk of them being injured by other passing vehicles. Other road users may pass close to the side of the road worker's vehicle which may create a dangerous environment for them to work in. To overcome this problem, one or more vehicle safety barriers may be installed on the side of the vehicle. The vehicle safety barrier, in an operational configuration, may extend a predetermined distance from the vehicle into the road indicating to other road users a safe passing distance.

An example of such a vehicle safety barrier device is shown in FIGS. 1 to 4. The device 100 comprises a housing 110 which is configured for mounting on a vehicle using a mounting plate 120. The mounting plate 120 comprises a mounting portion, for example including apertures 121 for use with fixing devices, such as screws or bolts (not shown) to secure the device 100 to the vehicle. It will be appreciated that the housing may be secured to the vehicle using an adhesive or other suitable means.

Figure 1:
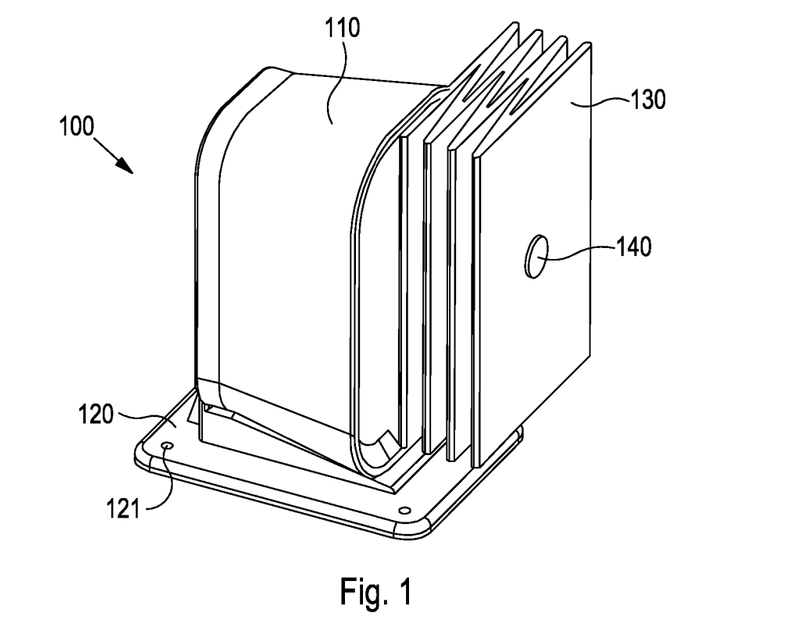
FIG. 1 shows a vehicle safety barrier in a stowed or retracted configuration according to a first embodiment of the invention.

The device 100 has an inflatable barrier arm 130, preferably made of flexible plastics material. As shown in FIG. 1, the arm 130 is configured such that in the retracted, stowed, position, it is fan-folded and lies substantially flat against the housing 110. Extending through an aperture in the arm 130 is a wire (not shown in FIG. 1), which is secured at one end to a distal portion of the arm 130 using a fastener 140. The opposing end of the wire may be secured to a recoil mechanism (not shown) within the housing 130. The recoil mechanism may comprise a recoil spring, which is biased such that the wire is taut and the arm 130 is kept in a retracted position when no other force acts upon it.

Figure 2:
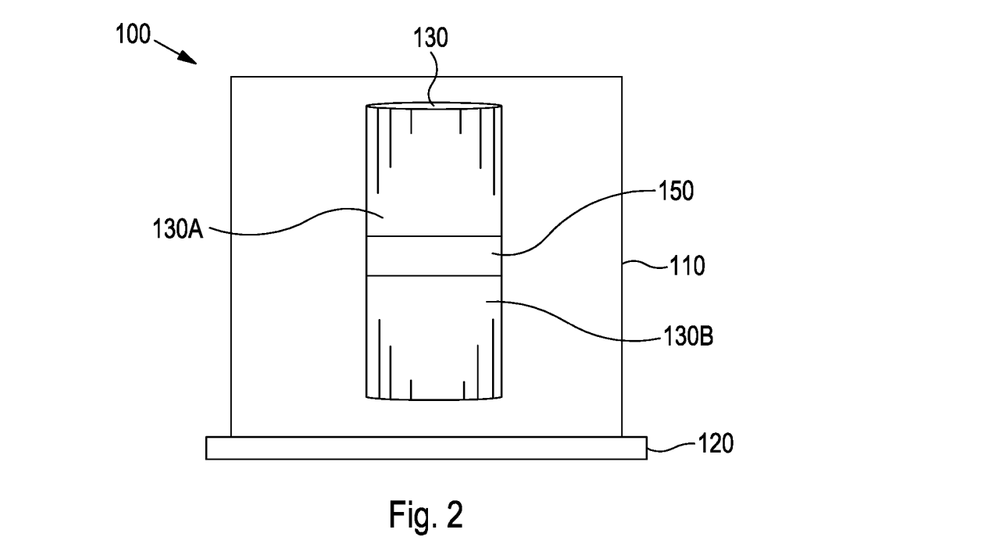
FIG. 2 is a front view of a vehicle safety barrier in a stowed or retracted configuration according to a second embodiment of the invention.
Figure 3:
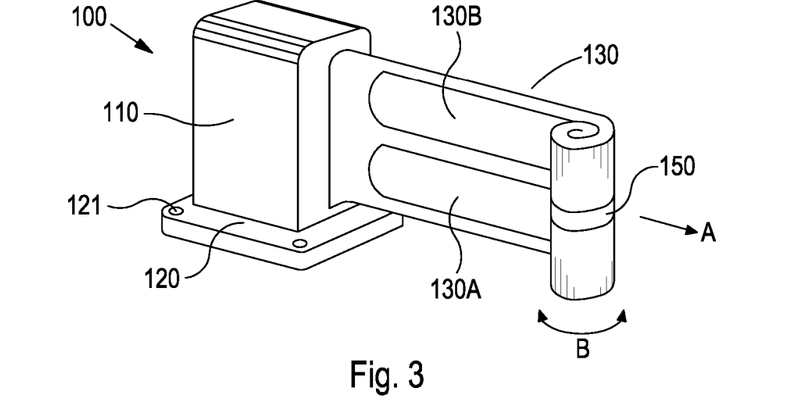
FIG. 3 is a perspective view of the vehicle safety barrier of FIG. 2 in a partially deployed configuration.

FIG. 2 shows a second embodiment of the device 100 where the barrier arm 130 is configured such that in the retracted, stowed position, the barrier arm 130 is rolled up in a coil. The barrier arm 130 may comprise a number of inflation channels 130A, 130B. Between the inflation channels 130A, 130B is a recoil mechanism, which may be a constant force spring 150 inserted into a channel in the barrier arm 130, such that the arm 130 is kept in a retracted, rolled up configuration when no other force acts upon it. FIG. 3 shows the second embodiment of the device 100 in a partially deployed configuration. The barrier arm 130 moves away from the housing 110 in the direction of arrow A and uncoils as indicated by arrow b, when the device 100 is activated. The inflation of the inflation channels 130A, 130B overcomes the retracting force of the constant force spring 150, causing the barrier arm 130 to be deployed, as will be described below in relation to FIG. 4.

The housing 110 comprises one or more openings (not shown) for connection to a pneumatic system (not shown). The pneumatic system may be a pre-existing pneumatic system of the vehicle or may be a dedicated apparatus installed as part of a vehicle's safety barrier system. In some embodiments, the housing 110 may also comprise pneumatic components providing a self-contained unit thereby not requiring connection to other vehicle-wide systems.

Figure 4:
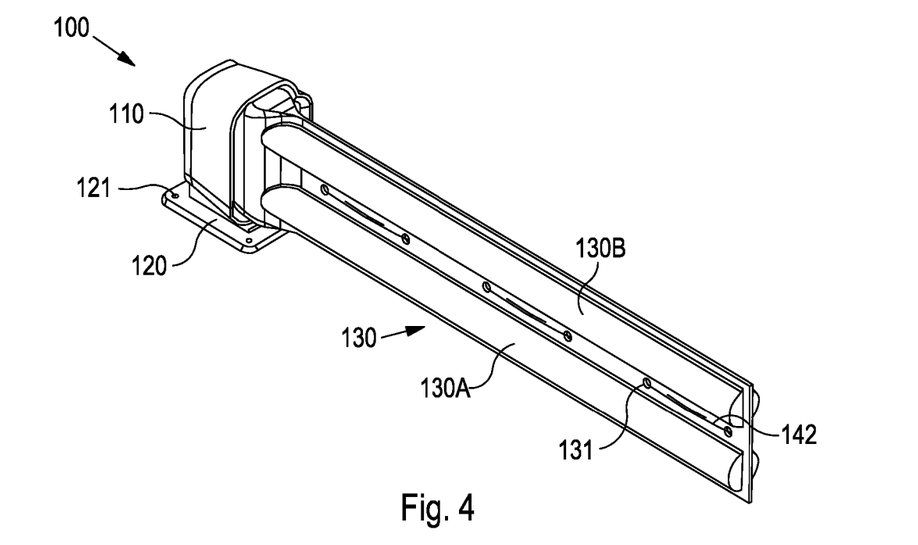
FIG. 4 shows the vehicle safety barrier of FIGS. 1 to 3 in a deployed or operational configuration.

FIG. 4 shows the vehicle safety barrier device 100 in an operational configuration. In the operational configuration, the barrier arm 130 is inflated and this overcomes the retracting force of the recoil mechanism (not shown), causing the arm 130 to extend out from the housing 110.

The barrier arm 130 may comprise a number of inflation channels 130A, 130B. The inflation channels 130A, 130B extend along the length of the barrier arm 130, and when inflated overcome the retracting force of the recoil mechanism. The position of the inflation channels 130A, 130B allows for space on the barrier arm 130 to be used for other features to improve visibility. For example, as described above in relation to FIG. 1, the space between the inflation channels 130A, 130B may be used for the wire 142 of the recoil mechanism. Other means of increasing the visibility of the device may be placed in these spaces, and/or around the periphery of the barrier arm 130. For example, the spaces may carry illumination or fluorescent elements. For better visibility in low light situations, flashing lights, such as light emitting diodes may be used.

In some embodiments, the barrier arm 130 may be illuminated. For example, the inflation channels 130A, 130B may act as light guides. In this embodiment, the housing 110 may comprise an illumination element (not shown), such as a light, which is arranged to shine through the barrier arm 130.

As mentioned above, in the first embodiment, the barrier arm 130 has apertures 131 through which a wire 142 is threaded. The wire 142 is connected at one end to the recoil mechanism of the housing 110, and at the opposing end, a distal portion of the barrier arm 130. In the second embodiment, a constant force spring 150 may arranged through a channel in the barrier arm 130, such that the barrier arm 130 is kept in the retracted, stowed, position when no other force acts upon it.

When inflated, the air pressure overcomes the retracting force of the recoil mechanism, allowing the barrier arm 130 to extend outwards of the housing 110. Once the pneumatic system has been deactivated, the air pressure is no longer sufficient to overcome the retracting force of the recoil mechanism, which causes the barrier arm 130 to move to the retracted configuration, as shown in FIGS. 1 and 2.

In some embodiments, to further increase visibility, the barrier arm 130 may move cyclically between the operational and stowed configurations, thereby providing a dynamic indicator to any third-party passing vehicles.

Figure 5A:
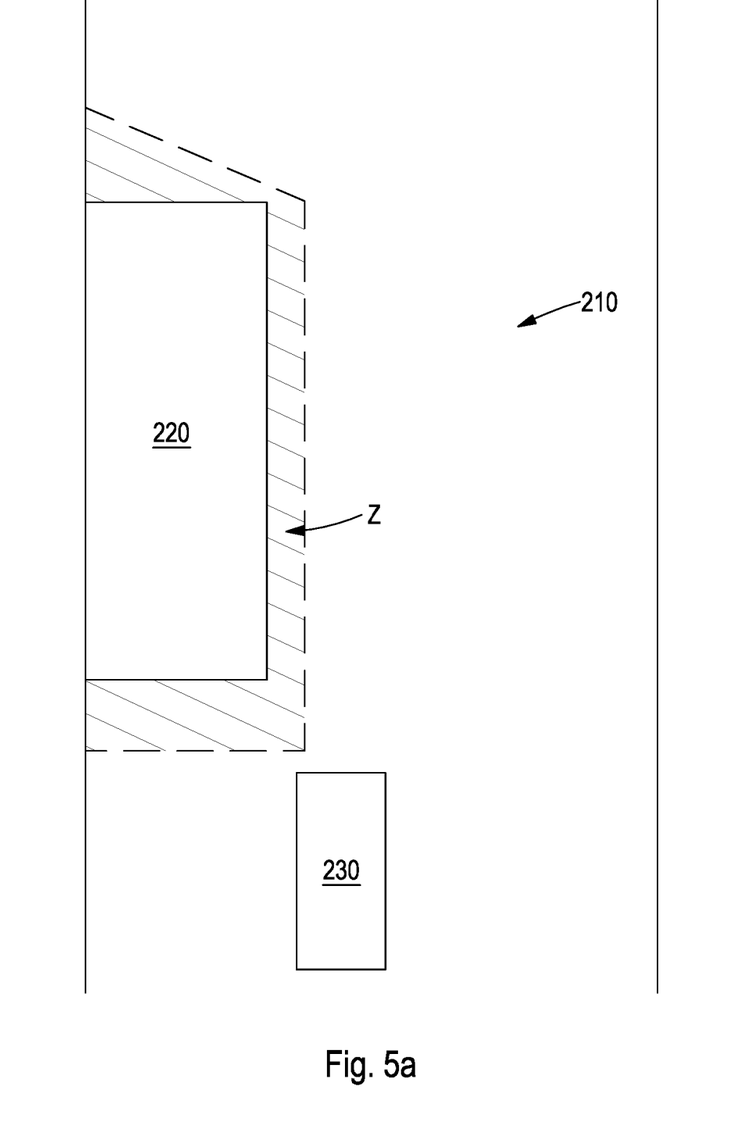
FIG. 5*a* is a schematic view from above of a vehicle with no vehicle safety barriers, on a roadway, and a corresponding safety zone.
Figure 5B:
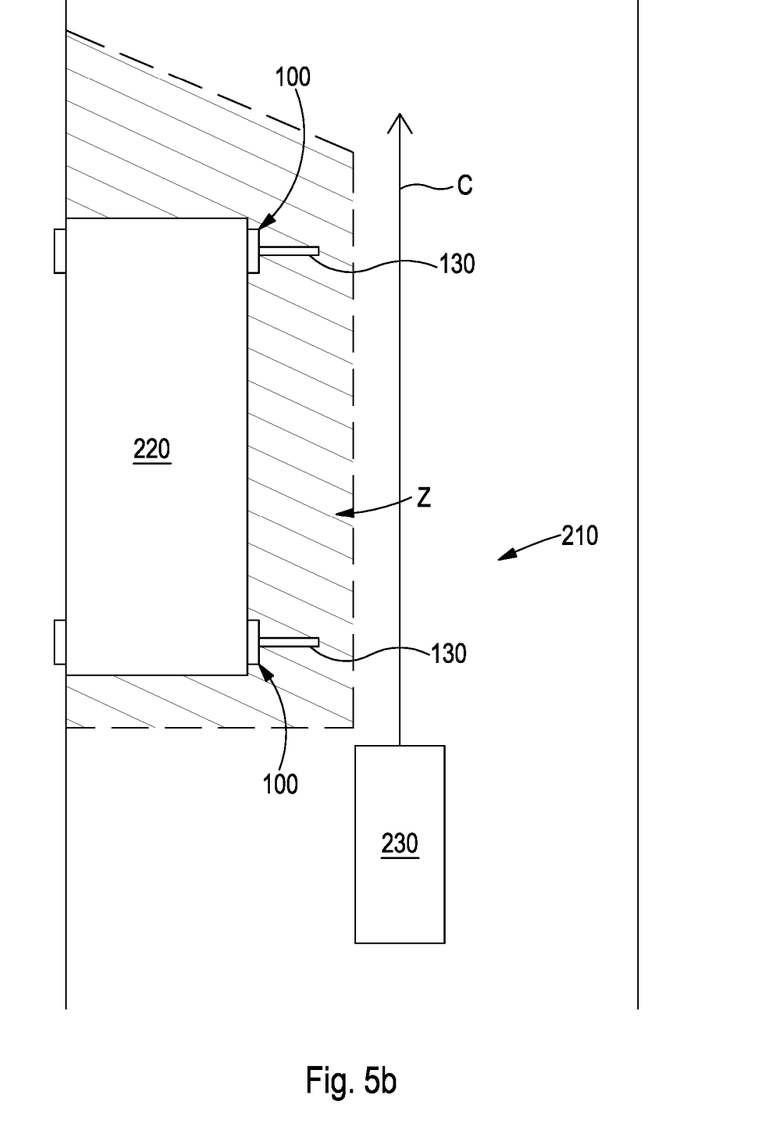
FIG. 5*b* is a schematic view from above of a vehicle with vehicle safety barriers in an operational configuration, on a roadway, and a corresponding safety zone.

FIGS. 5A and 5B show a top-down schematic view of a vehicle 220 positioned at the side of a road 210. In FIG. 5A, the vehicle 220, such as a transporter, refuse truck, or delivery truck is positioned at the side of the road 210 and does not have vehicle safety barriers installed. Without such barriers, no safe zone is indicated, and an operative working beside the vehicle 220 may have only a nominal area, indicated by the hatched area Z, in which to work.

In FIG. 5B, the vehicle 220 has vehicle safety barrier devices 100, in accordance with the present invention. The vehicle safety devices 100 are shown in the operational configuration, wherein the barrier arms 130 extend into the road. When the barrier arms 130 are in the operational configuration, a safety zone Z' is created. The barriers 100 deter other road users 230 from passing close to the side of the vehicle 220. Accordingly, a worker is provided with an increased area Z' to perform his/her tasks.

It will be appreciated that the vehicle 220 may have a number of vehicle safety barrier devices 100 positioned along either side of the vehicle 220, as well as on the front and back, where necessary. Each of the vehicle safety barrier devices 100 may be operable separately depending on where the vehicle 220 is located. For example, on vehicles 220 which are located on the left-hand side of the road 210, as shown in FIG. 5B, it may only be necessary to deploy the vehicle safety barrier devices 100 located on the right-hand side of the vehicle 220, and vice-versa.

Enabling the vehicle safety barrier devices 100 to be operable independently of one another ensures that only the devices 100 necessary are deployed. For example, as shown in FIG. 5B it would be undesirable to deploy such devices 100 on the left-hand side of the vehicle 220 as these would project into the pavement 212 and inconvenience pedestrians which pose little safety risk to workers. However, in some embodiments, it may be desirable to deploy the vehicle safety barriers on the pavement side of the vehicle 220 to provide a safe passing distance for pedestrians, when potentially dangerous tasks are being undertaken.

Therefore, as shown in FIG. 5B, the vehicle safety barrier devices 100 are activated and move into an operational position, whereby the inflatable barrier arm 130 laterally extends from the side of the vehicle 220, indicating a safe passing distance. Other vehicles 230 will then pass the vehicle 230 along arrow C, thereby leaving a safe distance between themselves and the vehicle 220.

As the barrier arm 130 is inflatable and made of a flexible material, if an other vehicle 230 were to strike the barrier arm 130, it would deflect out of the way without damaging the device 100 itself or the passing vehicle 230. In some embodiments, the barrier arm 130 may comprise impact and proximity sensors (not shown) which are capable of detecting when a third-party vehicle 230 is close-by or when one impacts the barrier arm 130. This information may be transmitted to a remote device (not shown) for future processing and planning. Such sensors may be capable of detecting the position and force of an impact.

In some embodiments, the proximity sensors may be used to determine when there has been a period of no or little movement. When undertaking some tasks workers may be working in the vicinity of the barriers 100, therefore it would be expected that any proximity sensors would detect the worker. In these situations, the system may be arranged such that if the proximity sensors are not triggered within a predetermined time period an alert is sent to the remote device.

As mentioned above, other indication means, such as lights may form part of the barrier arm 130 providing increased visibility to passing vehicles 230, especially in low-light conditions.

Figure 6A:
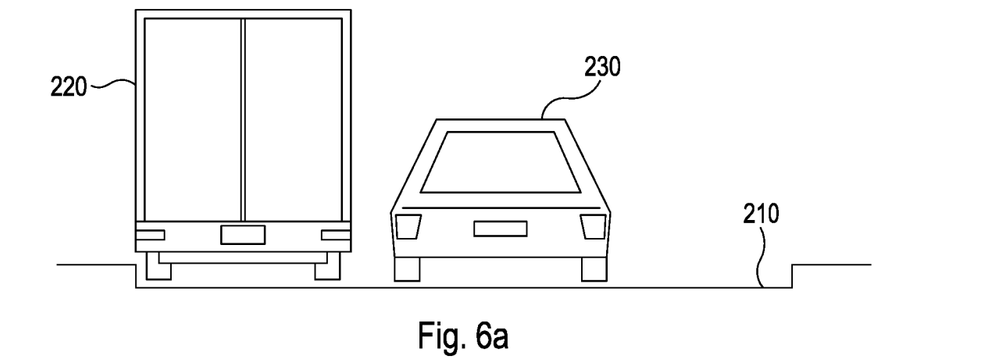
FIGS. 6*a* and 6*b* are schematic views corresponding to FIGS. 5*a* and 5*b*, respectively, from "road" level.
Figure 6B:
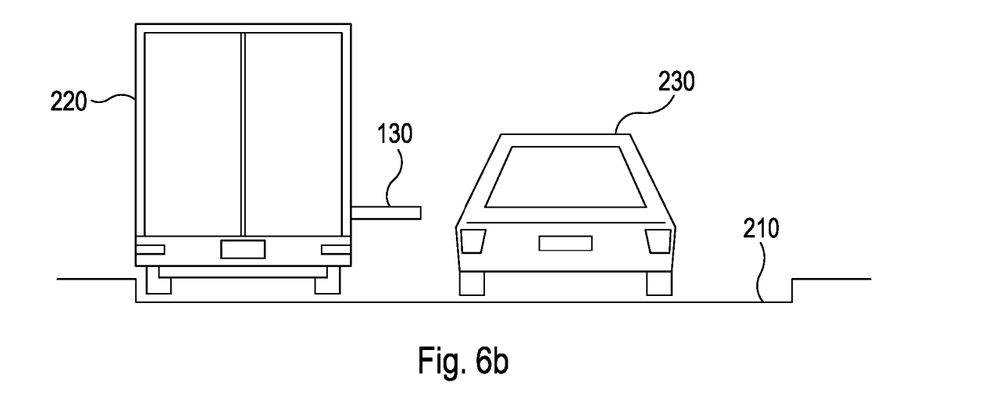

FIGS. 6a and 6b correspond to FIGS. 5a and 5b respectively. In FIG. 6a, a car 230 passes close to a parked truck 220, whereas in FIG. 6b the truck 220 has a barrier arm 130 deployed and the car 230 passes at a safer distance.

Figure 7:
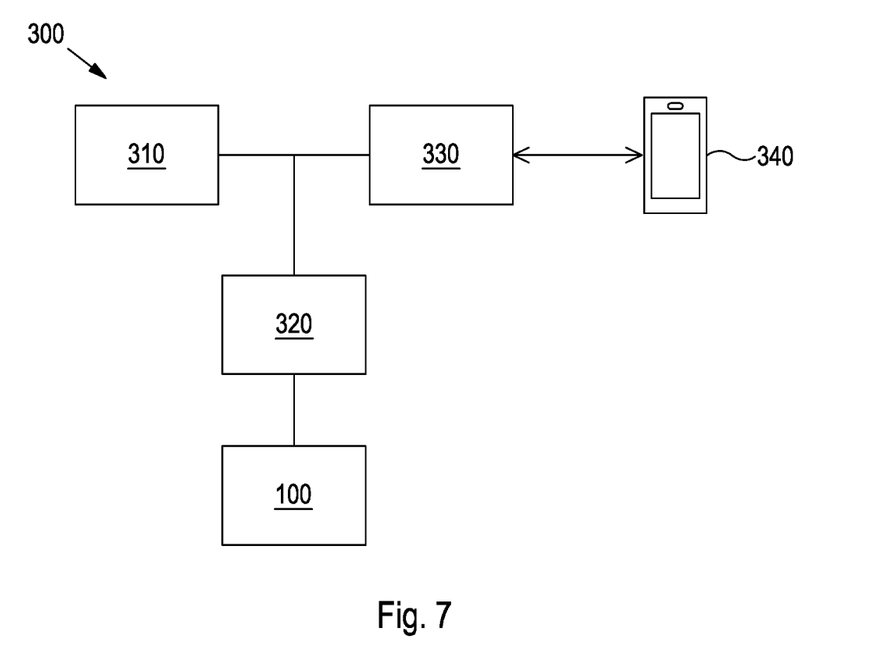
FIG. 7 shows an exemplary schematic system according to an embodiment of the invention.

FIG. 7 shows an overview of a system 300 according to an embodiment of the invention. The system comprises at least one vehicle safety barrier device 100, an activation module 310, a deployment module 320, and optionally a communication module 330 for communication with one or more remote devices 340.

The barrier device 100 is connected to the deployment module 320. The deployment module 320 may comprise a vehicle's existing pneumatic system, or alternatively an entirely separate pneumatic system built-into or retrofitted onto a vehicle. In some embodiments, the deployment module 320 may form part of the barrier device 100 itself and be contained within the housing 110 of the barrier device 100.

The barrier device 100 is deployed and retracted by means of an activation module 310. The activation module 310 may comprise a button located within the driver cab of the vehicle or on the barrier device housing 110 itself. When activated, the activation module 310 signals the deployment module 320 to start inflating or deflating the barrier device 100. In some embodiments, the activation module 310 may instruct a processor (not shown) to periodically inflate and deflate the barrier device 100.

Some embodiments of the system 300 may comprise a communications module 330. The communications module 330 may be arranged for wired or wireless communication with one or more remote devices 340, such as via the vehicle's CAN network, or via Wi-Fi or Bluetooth®. The remote device 340 may enable a worker to activate the activation module 310 remotely. Similarly, the communications module may be used to transmit data obtained, such as use time, detected impacts, and proximity information gathered from one or more sensors of the barrier device 100 to one or more remote devices 340, wirelessly, e.g. via a cellular network (not shown) so that a controller, such as a fleet manager, at a remote location may monitor activity.

For example, a worker may have a portable handheld device which may be used for the activation and deactivation of the barrier device 100 by sending a signal to the activation module 310 via the communications module 330. Meanwhile, once the device 100 has been activated, duration of use and other statistics relating to the use of the device may be transmitted to a remote location, such as a fleet manager. This information may be processed to obtain accurate data on the use of the devices as well as inform future training practices. In another circumstance, where an impact is detected a warning may be shown on the portable handheld device, alerting the user to the event.

Figure 8:
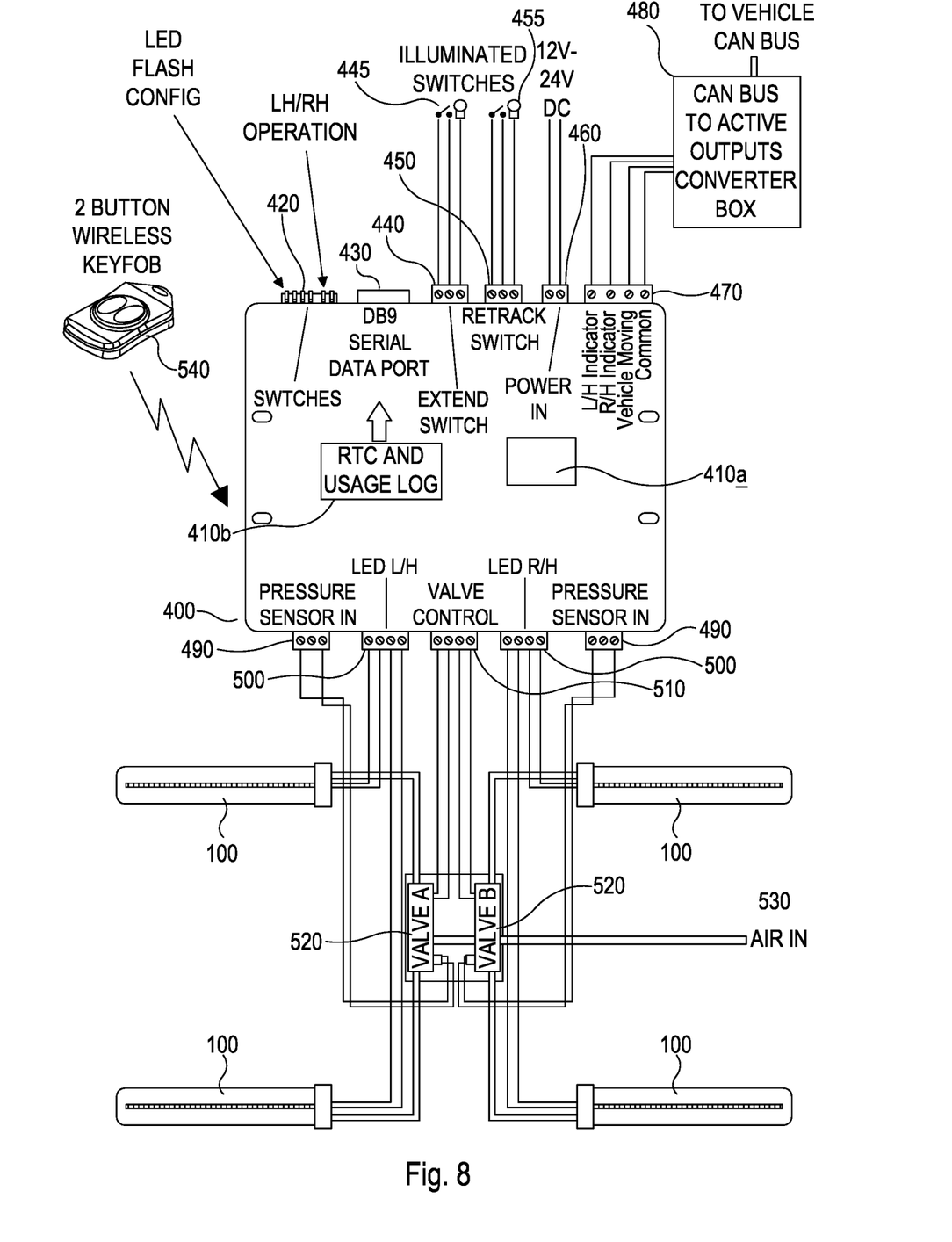
FIG. 8 is a detailed schematic view of a control system in accordance with the embodiments of FIGS. 1-7.

Turning to FIG. 8, this is a schematic diagram showing the control of the safety barrier apparatus in accordance with embodiments of the invention.

A hardware box 400 houses most of the control apparatus for the system and includes a microprocessor 410a and log 410b, system configuration switches 420, a DB9 serial port 430, switchgear 440 for extending the or each barrier and switchgear 450 for retracting the or each barrier, both connected to respective illuminated switches 445, 455 mounted in the cabin of the vehicle.

A power connector 460 connects to 12- or 24- volt power of the vehicle, and connections 470 communicate with the CANBUS of the vehicle via a CANBUS-to-active-outputs converter box. 480.

The housing also has connections 490 for pressure sensors, connections 500 to the left-hand and right-hand LEDs on the barriers and a valve control connection 510 which controls the operation of deployment valves 520 which control the supply of compressed air from the vehicle's compressor (not shown but represented at 530) to the left and right-sided barriers 100.

A wireless key fob 540 with two buttons communicates with the apparatus.

As can be seen from the schematic, the driver of the vehicle has dashboard mounted control—using left and right, push on/push off buttons 445, 455. The buttons are illuminated when in the on position and control LED and air solenoid operation. The power output to drive the 24 v LEDs—uses 2.0 amp for each side.

The CANBUS ECU is mounted in the drivers cab and hard wired. A GPS for the ECU is to be mounted inside the box 400 and operated remotely via RF.

The output to the 24 v air solenoids is 1 amp per unit.

A master switch (not shown) is provided on exterior of the ECU box (CANBUS), or exterior of the control box 400 (GPS), to isolate and retract the barriers in an emergency.

A real-time clock is provided by the processor 410 a for log files, as is the data output port 430.

An optional GSM module port (not shown) can be provided, along with a GPS module, which can be used by those who require functionality reports for audit purposes.

The air pressure sensors are used to detect deployment failure. Feedback can then be provided to cab-mounted buttons and, optionally, remotely located controllers through a GSM.

A GPS module can be used to effect retraction of the barriers automatically when movement of the vehicle above a threshold speed is detected. Reset may be only be activated when the buttons are pressed and the vehicle is stationary.

The cut off speed for retraction of the barriers may be selected up to 10 mph, with 2 mph being the default setting.

The CANBUS/GPS is switchable to cover all vehicle models and types of installation.

The left and right indicator input works when the GPS dip switch is selected. Otherwise all data is found through CANBUS.

It is envisaged that manufacturers would request CANBUS integration at the build stage, while retro-fit operators will specify GPS only with an indicator connection for ease of installation, as this will require only power and air supplies to work. The most suitable feed from the left-hand indicator (see below) can then be identified.

When the left or right button is pressed, the button flashes until the barrier is fully deployed. At which time, the button remains constantly lit until pressed to retract the barrier. This is to raise the driver's awareness that the barrier is deployed.

The remote fob 540 is for use by the driver as an additional control.—This works in together with the master switch in the cab, so if the barrier is switched off (stowed status) at one switch, it can then be switched on (deployed status) at the other.

The barriers deploy left or right (or both), with LED's coming on instantly to provide visual confirmation of this. The LEDs operate on a rapid burst sequence.

There is the option for near-side barriers to work with the near-side vehicle indicator (automatically) at speeds up to 10 mph with the same flash sequence on the barriers as the truck indicators when deployed, as will be discussed below.

Optionally the log file may record barrier left and right deployment, along with faults detected, and time and date of detection.

As mentioned above, one important use of the barrier is in the protection of cyclists when a large vehicle is turning. Currently, if a cyclist seeks to pass a large vehicle, such as a bus or truck, on the inside (nearside) only the vehicle indicators can provide a warning that the vehicle is about to turn into the cyclist's path. Barriers in accordance with the present invention can be deployed automatically when the indicator is used and this raise awareness of danger for an approaching cyclist who may be in the blind spot of a driver of the vehicle. The LED lights on the barrier can be made to operate at the same time as the flashing vehicle indicator, more preferably in synchronization therewith. The system can be configured to work with vehicles that drive on the left side of the road, as well as those who drive on the right side of the road.

Another use of the barrier is on the front of a tall vehicle, such as a lorry, when the vehicle is stationary, for example at a pedestrian crossing. Currently it is possible for a pedestrian, or other vulnerable road user, to occupy a space close the front of the vehicle and remain unnoticed by the driver, if the latter is seated in a much higher position. The presence of the barrier, protruding from the front of the vehicle, is a visible reminder to the pedestrian or other vulnerable road user not to stand or pass too close to the vehicle. Also, if the pedestrian keeps to the distance set by the barrier he or she may safely remain in the view of the driver.

The pressure sensor system can warn the driver of a pressure change in the barrier, such as would occur when the barrier is pushed.

Although the example described above utilises air from a vehicle's main compressor, there could instead be installed a local compressor, or air pump, for each barrier or pair of barriers operating at a lower pressure. This would obviate the need for high pressure valves, which would reduce the cost of the units.

Systems and apparatus, such as those described above and in accordance with the present invention, provide an approach to ensuring safety for workers required to work at the roadside.

Whilst the embodiment shown in the Figures and the examples described above relate to a pneumatically controlled barrier arm, the skilled person will appreciate there are other methods of causing such an arm to move between an operational and stowed configuration, for example, hydraulics, and/or mechanical mechanisms.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. A vehicle safety barrier system for mounting on a vehicle, the barrier system comprising an inflatable barrier arm, wherein the barrier arm is configured for movement between a first, stowed position in which the arm is not inflated, and a second, operational position in which the arm is inflated and wherein, when in the second position, the barrier arm is arranged to project a predetermined distance from the vehicle to indicate a safe passing distance, wherein the barrier arm is caused to inflate by a pneumatic actuator connected to a source of compressed air, and wherein the system comprises one or more impact sensors arranged in use to detect an impact on the barrier by detecting a pressure change in the barrier arm.

2. The vehicle safety barrier system of claim 1 further comprising a biasing means for biasing the barrier arm into the stowed position.

3. The vehicle safety barrier system of claim 2, wherein the biasing means is a recoil spring.

4. The vehicle safety barrier system of claim 1, wherein the barrier arm is configured to periodically move between the stowed position and operational position.

5. The vehicle safety barrier system of claim 1, wherein the barrier arm is activated by a switch.

6. The vehicle safety barrier system of claim 1, wherein the barrier arm is activated remotely or automatically.

7. The vehicle safety barrier system of claim 1 further comprising a deployment indicator for indicating when the barrier arm is in the operational position.

8. The vehicle safety barrier system of claim 1, wherein the barrier arm comprises one or more lights.

9. The vehicle safety barrier system of claim 1, wherein a housing mounts the barrier arm on a vehicle, and wherein the housing comprises one or more lights.

10. The vehicle safety barrier system of claim 9, wherein the one or more lights are arranged to shine through the barrier arm.

11. The vehicle safety barrier system of claim 1, wherein the barrier arm comprises one or more proximity sensors.

12. The vehicle safety barrier system of claim 1, further comprising a communication means for communication with a server.

13. The vehicle safety barrier system of claim 12, wherein the server is at a remote server location.

14. The vehicle safety barrier system of claim 12, wherein a position and/or deployment status of the barrier arm is arranged to be transmitted to the server.

15. The vehicle safety barrier system of claim 12, wherein an impact detected by the one or more impact sensors is arranged to be transmitted to the server.

16. The vehicle safety barrier system of claim 1, wherein the actuator is under the control of an activation device.

17. The vehicle safety barrier system of claim 16, wherein the activation device comprises a portable electronic device, such as a smartphone.

18. The vehicle safety barrier system of claim 17, wherein a status of the system is arranged to be recorded on the portable electronic device.

19. A method of deploying a vehicle safety barrier by controlling a flow of air into and out of an inflatable barrier arm of the vehicle safety barrier, wherein the barrier arm is configured for movement between a first, stowed position in which the arm is not inflated, and a second, operational position in which the arm is inflated, and wherein, when in the second position, the barrier arm is arranged to project a predetermined distance from the vehicle to indicate a safe passing distance, wherein the method includes pneumatically inflating the barrier arm from a source of compressed air and detecting an impact on the barrier arm using a pressure sensor.

20. A vehicle comprising a vehicle safety barrier system according to claim 1.

* * * * *